United States Patent [19]

Glass et al.

[11] Patent Number: 4,683,138

[45] Date of Patent: Jul. 28, 1987

[54] LOW MOISTURE, SUGARLESS, CENTER-FILLED CHEWING GUM

[75] Inventors: Michael Glass, Fairlawn; Joseph Hoholick, Hopatcong, both of N.J.; Daniel A. Orlandi, Flushing, N.Y.

[73] Assignee: Warner-Lambert Company, Morris Plains, N.J.

[21] Appl. No.: 905,373

[22] Filed: Sep. 8, 1986

[51] Int. Cl.$^4$ .............................................. A23G 3/30
[52] U.S. Cl. ........................................ 426/5; 426/103
[58] Field of Search ........................................ 426/3–6, 426/103

[56] References Cited

U.S. PATENT DOCUMENTS

| | | | |
|---|---|---|---|
| 3,806,290 | 4/1974 | Graff et al. | 426/5 |
| 3,857,963 | 12/1974 | Graff et al. | 426/5 |
| 3,894,154 | 7/1975 | Graff et al. | 426/5 |
| 4,156,740 | 5/1979 | Glass et al. | 426/3 |
| 4,157,402 | 6/1979 | Ogawa et al. | 426/5 |
| 4,250,196 | 2/1981 | Friello | 426/5 |
| 4,252,829 | 2/1981 | Terrevazzi | 426/5 |
| 4,292,329 | 9/1981 | Ogawa et al. | 426/5 |
| 4,316,915 | 2/1982 | Friello et al. | 426/5 |
| 4,466,983 | 8/1984 | Cifrese et al. | 426/5 |
| 4,514,422 | 4/1985 | Yang | 426/3 |
| 4,581,234 | 4/1986 | Cherukuri | 426/3 |

FOREIGN PATENT DOCUMENTS 1469031  3/1977  United Kingdom .

Primary Examiner—Jeanette Hunter
Attorney, Agent, or Firm—Anne M. Kelly; Gary M. Nath

[57] ABSTRACT

This disclosure relates to a low-moisture, sugarless, center-filled chewing gum and a process for the preparation thereof, in which a low moisture, liquid center-fill is incorporated into a cavity within a substantially anhydrous chewing gum shell. The center-filled chewing gum disclosed has improved non-staling properties and an extended shelf-life. The liquid center-fill has a water content of about 6% to about 8%, based on the total weight of the liquid center-fill, a viscosity of about 22,000 to about 85,000 centipoises at 25° C., and contains a natural or synthetic gum, a glycerin humectant and an additonal, water-miscible humectant.

23 Claims, No Drawings

LOW MOISTURE, SUGARLESS, CENTER-FILLED CHEWING GUM

FIELD OF THE INVENTION

The present invention relates to a low moisture, sugarless center-filled chewing gum having improved non-staling properties and extended shelf-life, in which a sugarless, low moisture, liquid center-fill is incorporated into the cavity within a chewing gum shell in which the water content is not greater than 2% by weight thereof.

BACKGROUND OF THE INVENTION

Center-filled chewing gums are well known in the art. U.S. Pat. No. 4,156,740 to Glass et al. discloses a sugarless center-filled chewing gum which has incorporated in both the chewing gum shell and the center-fill a composition which contains: from 0.4 to 1 part by weight of a natural or synthetic gum; from 50 to 84 parts by weight of a glycerin humectant; and from 15 to 49.6 parts by weight of an additional water-miscible humectant ingredient which is sorbitol solution or sobitol solution and propylene glycol.

U.S. Pat. No. 4,466,983 to Cifrese et al. discloses a center-filled chewing gum having a sugarless, semi-liquid center-fill which includes a hydrogenated starch hydrolysate, sorbitol solution, glycerin and optional flavoring, wherein the total water content of the semi-liquid center-fill is less than about 5% by weight.

U.S. Pat. No. 4,250,196 to Friello, discloses a liquid center-fill which is an aqueous solution consisting essentially of hydrogenated starch hydrolysate present in the solution as a solid in an amount of about 75 to about 93% by weight of the liquid fill.

U.S. Pat. No. 4,316,915 to Friello et al. discloses a sugarless center-filled chewing gum having a liquid fill consisting essentially of from about 94% to 99.5% glycerin and about 0.5 to 6% by weight of a thickener, the water content of the center-fill being no more than about 2% or less.

U.S. Pat. No. 3,894,154 to Graff et al. discloses a center-filled chewing gum which includes, as a liquid fill, an aqueous solution having a dissolved solids portion and a water-miscible humectant for retarding increases in the viscosity of the center fill. The humectant is glycerin, and the dissolved solids portion may include invert sugar, sucrose and glucose. British Pat. No. 1,469,031 discloses a center-filled chewing gum similar to that disclosed in U.S. Pat. No. 3,894,154 except that the humectant may be glycerin, polylimonene, sorbitol solution, lecithin, dextrose, gum arabic, glyceryl monostearate, polyethylene glycol or propylene glycol.

U.S. Pat. No. 4,292,329 to Ogawa et al. discloses a method of improving the flavor-retaining capacity of a center-fill chewing gum by incorporating into the center-fill an emulsifier which functions both as an emulsifier and retention agent to prevent the flavor from penetrating into the gum base. The liquid fill generally contains from 5 to 10% of water. U.S. Pat. No. 4,157,402 to Ogawa et al. also teaches the use of an emulsifier for similar purposes but requires the emulsifier to have a particular hydrophile-lipophile (HLB) range.

U.S. Pat. No. 4,252,829 to Terrevazzi discloses a liquid fill for center-filled chewing gum consisting essentially of an aqueous solution containing a dissolved solid portions, 8 to 13% liquid sorbitol and 2 to 5% of a propylene glycol-flavor solution.

Substantially anhydrous sugarless chewing gums are also known in the art. U.S. Pat. No. 4,514,422 to Yang et al. discloses sugarless gums, including chewing gums and bubble gums, having improved shelf-life and resistance to staling, which contain a substantially anhydrous mixture of a gum base, at least one sugar alcohol and glycerin wherein the glycerin is present in amounts of about 8% to about 18% by weight, and wherein the gum contains no greater than 2% by weight thereof, of water in any form.

U.S. Pat. No. 4,581,234 to Cherukuri et al. discloses a chewing gum composition having a moisture content up to about 0.3% by weight, containing a gum base which softens within a temperature range of about 40° C. to about 60° C., flavoring, a softener and a sweetener, and teaches that such chewing gum compositions have exceptionally long periods of shelf-life.

U.S. Pat. No. 3,806,290 and U.S. Pat. No. 3,857,963 to Graft et al., discloses a continuous method and apparatus for extruding chewing gum to form a hollow-centered rope of gum and forcing the center-fill into the cavity within the rope of gum.

The above prior art diclosures indicate that when the amount of moisture in a chewing gum composition, whether it be a sugar containing or sugarless gum, is reduced, the stability and hence the shelf-life of the gum is increased. In addition, certain ingredients which deteriorate rapidly in the presence of water, may be used with substantially anhydrous chewing gums. Thus, there are a number of commercial advantages attendant upon the use of substantially anhydrous chewing gums. Although such gums are extrudable and could be used to form the shell of a center-fill sugarless chewing gum, prior art sugarless center-fills have not been used successfully within the cavity of a substantially anhydrous chewing gum shell. The current sugarless center-fills either contain too much water and migrate into the chewing gum shell or are too viscous to be pumped into the hollow center of the chewing gum shell as is required in continuous commercial processes used for making center-filled gum.

SUMMARY OF THE INVENTION

The present invention provides a low moisture sugarless center-filled chewing gum piece having an outer chewing gum shell enclosing a cavity and a sugarless liquid center-fill within the cavity, wherein the chewing gum shell contains not more than about 2% by weight water; and wherein the sugarless liquid center-fill has a water content of about 6% to about 8%, based on the total weight of the liquid center-fill and a viscosity of about 20,000 to about 85,000 centipoises at 25° C.

The low moisture, liquid center-fill of this invention comprises about 0.2% to about 1.5% by weight of a natural or synthetic gum selected from the group consisting of carboxymethylcellulose gums, pectin, propylene glycol alginates, agar and gum tragacanth; about 85% to about 93% by weight of a glycerin humectant; about 6% to about 12% by weight of an additional water-miscible humectant ingredient selected from the group consisting of (a) sorbitol solution or (b) sorbitol solution and propylene glycol; and optional flavor and sugarless sweetener in an amount sufficient to impart taste thereto.

The low moisture, sugarless center-fill is prepared by mixing the natural or synthetic gum with the glycerin humectant in a weight ratio of from about 1:3 to about 1:24, based on the weight of the natural or synthetic gum, to the weight of glycerin, for a time sufficient to disperse the gum in the glycerin; blending the additional water-miscible humectant with an equal weight of glycerin and heating the blend to a temperature of about 60° C. to about 80° C.; adding the dispersion to the heated blend until a homogenous mixture is formed; adding the remaining glycerin to the homogenous mixture and mixing for a time sufficient to fully hydrate the natural or synthetic gum with the water present in the reaction mixture and obtain a center-fill having a viscosity of about 20,000 to about 85,000 centipoises at 25° C.

DETAILED DESCRIPTION OF THE INVENTION

The low moisture, sugarless center-filled chewing gum piece of the present invention comprises an outer shell and a cavity enclosed therein containing a sugarless liquid center-fill having a water content of about 6 to about 8% by weight, based on the total weight of the liquid center-fill and a viscosity of about 20,000 to about 85,000 centipoises at about 25° C.

The term "chewing gum piece" as used herein refers to a finished product, that is, a center-filled chewing gum piece composed of an outer chewing gum shell and a liquid center-fill.

The liquid center-fill of this invention comprises specific amounts of a natural or synthetic gum, a glycerin humectant and an additional water-miscible humectant which may be sorbitol solution or a combination of sorbitol solution and propylene glycol.

Natural or synthetic gums suitable for use in the low moisture, liquid center-fill of this invention incude carboxymethylcellulose gums, pectin, propylene glycol alginate, agar and gum tragacanth. Such gums are known and are commercially available. Among the aforementioned gums, carboxymethylcellulose gums of average high molecular weight and viscosities ranging from about 1,000 to about 4,500 centipoises at a 1% concentration at 25° C. are preferred for use in the practice of this. More particularly, sodium carboxymethylcellulose having a high viscosity ranging from about 2,500 to about 4,500 centipoises or sodium carbomethylcellulose having a low viscosity ranging from about 1,000 to about 2,800 centipoises, at 1% concentration at 25° C., is preferred. Such products are sold commercially by Hercules, Incorporated, Wilmington, Del. In addition, propylene glycol alginates which are esters of alginic acid, are sold commerically and are also suitable for use as the natural or synthetic gum ingredient.

The natural or synthetic gum ingredient is used in the sugarless center-fill of this invention in an amount of about 0.2% to about 1.5% by weight, based on the total weight of the center-fill. For a low viscosity carboxymethylcellulose, it is preferable to use about 1.0% to about 1.5% by weight and for a high viscosity carboxymethylcellulose, it is preferable to use about 0.2% to about 0.5% by weight and for a high viscosity carboxymethylcellulose, it is preferable to use about 0.2% to about 0.5% by weight.

The glycerin humectant ingredient suitable for use in the center-fill of this invention is United States Pharmacopeia (USP) Glycerin containing not less than about 95% glycerin and about 5% water. The glycerin ingredient is used in an amount of about 85% to about 93% by weight, based on the total weight of the center-fill, preferably about 89% to about 93% by weight.

The additional weater miscible humectant is present in an amount from about 6% to about 12% by weight, preferably about 6% to about 10% by weight, based on the total weight of the center-fill of this invention. Sorbitol solution is the preferred additional humectant, particularly sorbitol solution USP, which contains not less than 69 grams and not more than 71 grams of total solids consisting essentially of sorbitol and a small amount of mannitol and other isometric polyhydric alcohols, in 100 grams of aqueous solution. If desired, a portion of the sorbitol solution humectant may be replaced with propylene glycol. Typically, such combinations include sorbitol solution and propylene glycol in ratios of from about 9 to about 1.

The moisture content of the sugarless center-fill prepared from the above ingredients is about 6% to about 8% by weight, based on the total weight of the center-fill, preferably about 6% to about 7.5% by weight. If the water content from the ingredients in the center-fill is below the aforementioned range, additional amounts of water up to such range may be added during processing. Additionally, the above-described center-fill ingredients when admixed in accordance with the process of this invention as is more fully described below, provide a sugarless low-moisture, liquid center-fill having a viscosity of about 20,000 to about 85,000, preferably about 20,000 to about 80,000 centipoises at 25° C.

It has been found that the above ingredients when used in the amounts specified, are critical in obtaining a sugarless center-fill which (1) retains liquidity and reamins stable when incorporated into a substantially anhydrous chewing gum shell; and (2) has sufficient liquidity to provide the squirt of flavor characteristic of acceptable center-filled chewing gums.

If an insufficient amount of the water-containing ingredients (i.e., glycerin and sorbitol solution) are utilized, the center-fill loses its squirt of flavor characteristic. However, if too much water is present, the water will migrate into the anhydrous chewing gum shell carrying with it the other center-fill ingredients and causing deterioration of the center-fill, as well as premature staling of the anydrous chewing gum shell within a very short period of time. Similarly, there must be a sufficient amount of the natural or synthetic gum present in the center-fill to tie up the water present in the other ingredients. The natural or synthetic gum hydrates in the presence of the water and serves to thicken the center-fill to a particular viscosity. If too much thickener is used, however, and the viscosity increases above a critical range. In such a case, commerical processes for preparing center-filled gums, which entail pumping the center-fill into a hollow-centered rope of chewing gum, cannot be utilized. Thus, applicants have found a particular combination of ingredients which, when combined in the critical amounts specified, provides a low moisture, sugarless center-fill capable of being incorporated into a substantially anhydrous chewing gum shell.

While the above desribed center-fill composition may itself be used within the cavity of the sugarless chewing gum pierce of this invention, other additives such as flavoring agents, coloring, and synthetic sweeteners may be included to provide a product with enhanced consumer acceptability. Suitable flavoring agents which may optionally be added to the liquid center-fill are those well-known in the gum and confectionery art. For example, synthetic flavor oils, and/or oils derived from plants, leaves, flowers, fruits and so forth, and combinations thereof are useful.

Representative flavoring agents include spearmint oil, peppermint oil, cinnamon oil, and oil of wintergreen (methylsalicylate). Also useful are artificial, natural or synthetic fruit flavors such as citrus oils including lemon, orange, grape, lime, grapefruit and fruit essences including apple, strawberry, cherry, pineapple, and so forth.

The amount of flavoring agent employed is normally a matter or preference subject to such factors as flavor type and strength desired. In general, amounts of about 0.05% to about 2% by weight of the final center-fill are usable, with amounts of about 0.3% to about 1.5% being preferred and about 0.8% to about 1.2% being most preferred.

Similarly, synthetic sweeteners well-known in the art may optionally be added to the center-fill of this invention. Without being limited to particular artificial sweeteners, representative illustrations encompass water-soluble artificial sweeteners such as the soluble saccharin salts, i.e., sodium or calcium saccharin salts, cyclamate salts, such as the sodium salt and the like, and the free acid form of saccharin; dipeptide based sweeteners such as L-aspartyl-L-phenylalanine methyl ester and materials desribed in U.S. Pat. No. 3,392,131 and the like; dihydrochacone; glycyrrhizin; Stevia rebaudiana (Stevioside); and the synthetic sweetener 3,6-dihydro-6-methyl-1,1,2,3-oxathiazin-4-one-2,2-dioxide, particularly the potassium (Acesulfame-K), sodium and calcium salts thereof as described in German Pat. No. 2,001,017.7.

Such artificial sweeteners as are described above are generally used in amounts of 0.005% to about 1%, and most preferably 0.05% to about 0.08%, based on the total weight of the liquid center-fill.

The sugarless liquid center fill of this invention is prepared by a process involving the following critical sequence of reaction steps:

(A) The natural or synthetic gum is mixed with the glycerin humectant in a weight ratio from about 1:3 to about 1:24, based on the weight of gum to the weight of glycerin for a time sufficient to completely disperse the gum powder in the glycerin. If a low viscosity carboxymethylcellulose gum is used, a weight ratio of gum to glycerin of about 1:3 to about 1:6 is preferred. If a high viscosity carboxymethylcellulose gum is used, a weight ratio of gum to glycerin of about 1:12 to about 1:24 is preferred. Generally speaking, the natural or synthetic gum is completely dispersed in the glycerin within about 5 to about 30 minutes of mixing time.

(B) The additional water-miscible humectant is blended with an equal weight of glycerin and the blend is heated to a temperature of about 40° C. to about 100° C., preferably about 60° C. to about 80° C., and most preferably about 70° C., after which the heating is discontinued.

(C) The dispersion of (A) is then slowly added to the heated blend of (B) with mixing, generally for about 1 to about 20 minutes until a homogenous mixture is obtained. The addition and mixing time will vary with the size of the batch and the mixing equipment used.

(D) The remaining glycerin is then added to the homogenous mixture of (C) and mixing is continued until all of the natural or synthetic gum becomes fully hydrated by the water inherently present in the reaction mixture ingredients and the resulting center-fill has a viscosity of about 20,000 to about 85,000 centipoises at 25° C. Generally, mixing may be conducted for about 30 minutes to about 2 hours, preferably for about 60 minutes, to achieve complete hydration and thickening.

In a preferred embodiment, the sugarless liquid center-fill of the invention is prepared by:

A. mixing the natural or synthetic gum with the glycerin humectant in a weight ratio of from about 1:3 to about 1:24, based on the weight of gum to the weight of glycerin, for a time sufficient to disperse said gum in said glycerin.

B. blending the additional water-miscible humectant with an equal weight of glycerin and heating the blend to a temperature of about 60° C. to about 80° C.;

C. mixing the dispersion of (A) with the heated blend of (B) until a homogenous mixture is formed; and D. adding the remaining glycerin to (C) and mixing for a time sufficient to fully hydrate the natural or synthetic gum with the water present in the reaction mixture and obtain a center-fill having a viscosity of about 20,000 to about 85,000 centipoises at 25° C.

The above described sequence of mixing the ingredients of this invention is critical to achieve complete hydration of the natural or synthetic gum which serves as a thickener for the center-fill. Quite surprisingly, it has been found that the water present inherently in the critical amounts of the glycerin and sorbitol solution ingredients will, following the sequential mixing steps specified in the process of this invention, be brought into contact with the natural or synthetic gum for a time sufficient to achieve complete hydration of the gum. It may be theorized that the successful use of the moisture-containing center-fill within a substantially anhydrous chewing gum shell, in accordance with this invention, is dependent upon the hydration/water binding properites of the natural or synthetic gum ingredient in the center-fill. It is believed, but without being bound to a particular theory, that when the water in the center-fill becomes bound to the natural or synthetic gum ingredient, the center-fill does not migrate into the substantially anhydrous chewing gum shell. Equally surprising is the fact that, although the water is bound, the center-fill retains its squirt of flavor characteristics and can be pumped into a hollow-centered rope of chewing gum using known commercial processes and equipment.

Substantially anhydrous sugarless chewing gums suitable for use in the practice of this invention are known in the art, as, for example, the sugarless gums, including the chewing gums and bubble gums, of U.S. Pat. No. 4,514,422 which contain no greater than 2% by weight thereof, of water in any form. These gums are prepared by heating gum base and admixing therewith a softening agent, sorbitol, mannitol andfrom 10 to 18% by weight of glycerin, based on the total weight of the gum composition, followed by the addition of a flavoring agent and sweetener, with mixing. The sorbitol, mannitol, glycerin and gum base ingredients as initially added, have a limited water content.

Similarly the sugarless chewing gums of U.S. Pat. No. 4,581,234 having a moisture content of up to 0.3% by weight, are suitable for preparing the chewing gum shell into which the low moisture, sugarless center-fill, is incorporated in accordance with the practice of this invention. Such sugarless gums are prepared by heating a gum base which softens in the range of 40° C. to 60° C. and admixing therewith sorbitol powder, mannitol powder, a softening agent, and a flavoring agent.

U.S. Pat. No. 4,156,740 discloses the preparation of a sugarless, center-filled chewing gum. In accordance with this disclosure, a center-fill premix is prepared by dissolving sodium carboxymethylcellulose in glycerin, adding sorbitol solution USP and heating to 50° C., whereby a premix containing about 17–18% water is obtained. The sugarless chewing gum disclosed in U.S. Pat. No. 4,156,740 is prepared by mixing gum base, gum arabic solution, the above described center-fill premix, and an aqueous solution of a sweetening agent, then admixing therewith sorbitol, mannitol, and flavor, to obtain a chewing gum composition containing more than 3% water. Thus, both the center-fill premix and the chewing gum shell of prior art U.S. Pat. No. 4,156,740 have a water content greater than the water content specified for the center-fill and substantially anhydrous chewing gum shell of the present invention.

Low moisture, sugarless center-filled chewing gum pieces in accordance with the present invention may be manufactured according to methods known in the art with some minor modifications. For example, the apparatus and method disclosed in U.S. Pat. Nos. 3,806,290 and 3,857,963 may be utilized. Typically, substantially anhydrous, sugarless chewing gum is fed into a gum extruder and extruded through an orifice as a hollow-centered rope of chewing gum. A low moisture sugarless center-fill formulated in accordance with this invention is fed, under pressure, through an inner conduit to the hollow-center of the rope downstream of the orifice and the center-filled rope of chewing gum is passed into a sizing unit where rollers decrease the cross-sectional dimension of the rope gum and form individual gum pieces.

The low moisture sugarless center-filled gum pieces prepared according to the teachings of this invention contain from about 80% to about 90%, preferably about 85% to about 89% by weight of chewing gum and from about 10% to about 20%, preferably about 11% to about 15% by weight of center-fill, based on the total weight of a gum piece. In a particularly prepared embodiment of this invention, the sugarless center-filled gum contains about 89% by weight of chewing gum and about 11% by weight of center-fill.

The following examples are given to illustrate the invention, but are not deemed to be limiting thereof. All percentages given throughout the specification are based upon weight, unless otherwise indicated.

EXAMPLE I

A. CENTER-FILL

The center-fill of the invention is prepared from:

| Ingredient | Parts by Weight |
|---|---|
| Sodium Carboxymethylcellulose, Low Viscosity | 1 gram |
| Sorbitol Solution (30% water) | 10 grams |
| Glycerin (5% Water) | 89 grams |

1. One gram of sodium carboxymethyl cellulose is mixed with 6 grams of glycerin for 10 minutes.
2. Ten grams of sorbitol solution is blended with 10 grams of glycerin and heated to 70° C., then heating is discontinued.
3. The pre-mix from (1) is slowly added to (2) over a 5 minute period with mixing. The remaining 73 grams of glycerin are added and mixing is continued for approximately 60 minutes, until the viscosity of the center-fill reaches 77,000 centipoises at 25° C. The moisture content of the center-fill is 7.45%.

B. CHEWING GUM FORMULATION

Using the chewing gum formulation and procedure described in U.S. Pat. No. 4,514,422, a sugarless chewing gum having a moisture content of 1% by weight, is prepared.

C. CENTER-FILLED GUM

The chewing gum formulation of B is fed into a gum extruder and extruded through an orifice as a hollow-centered rope of chewing gum. The center-fill of A is fed, under pressure, through an inner conduit to the hollow-center of the rope downstream of the orifice; the center-filled rope of chewing gum is passed into a sizing unit where rollers decrease the cross-sectional dimension of the gum rope and form individual gum units wherein there is 89% by weight gum and 11% by weight center-fill. The freshly made gum pieces, when tested for taste and other organoleptic qualities, including squirt of flavor characteristics, were judged to be comparable to commercial sugarless center-filled chewing gum pieces.

EXAMPLE 2

A. CENTER-FILL

Following the procedures of Example 1, part A, a center-fill is prepared from the following ingredients, using, in Step 1, a weight ratio of sodium carboymethylcellulose gum to glycerin of 1:24, based on the weight of gum to glycerin:

| Ingredient | Parts by Weight |
|---|---|
| Sodium Carboxymethylcellulose, High Viscosity | 0.25 grams |
| Sorbitol Solution (30% Water) | 10.00 grams |
| Glycerin (5% water) | 89.75 grams |

A center-fill is obtained having a viscosity of 20,750 centipoises at 25° C. and a moisture content of 7.49%.

B. CHEWING GUM FORMULATION

Using the chewing gum formulation and procedure described in U.S. Pat. No. 4,514,422, a sugarless, chewing gum is prepared having a moisture content of 1% by weight.

C. CENTER-FILLED GUM

Center-filled gum pieces are prepared using formulations A and B and following the procedure of Example 1, part C. The freshly made gum pieces, when tested for taste and other organoleptic qualities, including squirt of flavor characteristics, were judged to be comparable to commercial sugarless center-filled chewing gum pieces.

EXAMPLE 3

A. CENTER-FILL

Following the procedure of Example 1, part A, a center-fill is prepared from the following ingredients, using, in Step 1, a weight ratio of sodium carboxymethylcellulose gum to glycerin of 1:3, based on the weight of gum to glycerin:

| Ingredient | Parts by Weight |
|---|---|
| Sodium Carboxymethylcellulose, | 1.50 grams |

| -continued | |
|---|---|
| Ingredient | Parts by Weight |
| Low Viscosity Sorbitol Solution (30% Water) | 6.10 grams |
| Glycerin (5% Water) | 92.40 grams |

A center-fill is obtained having a viscosity of 65,000 centipoises at 25° C. and a moisture content of 6.45%.

B. CHEWING GUM FORMULATION

Using the chewing gum formulation and procedure described in U.S. Pat. No. 4,514,422, a sugarless gum having a moisture content of 1% by weight, is prepared.

C. CENTER-FILLED GUM

Center-filled gum pieces are prepared using formulations A and B and following the procedure of example 1 part C. The freshly made gum pieces, when tested for taste and other organoleptic qualities, including squirt of flavor characteristics, were judged to be comparable to commercial sugarless center-filled chewing gum pieces.

COMPARATIVE EXAMPLES 4-9

TABLE 1
SUGARLESS CENTER-FILL
Parts by Weight of Total Chewing Gum Piece

| Ingredient | Prior Art A | Inventive B | Inventive C | Inventive D | Comparative E |
|---|---|---|---|---|---|
| Sodium Carboxymethyl cellulose | 0.8 | 0.11 | 0.027 | .16 | .14 |
| Sorbitol Solution (30% Water) | 5.34 | 1.09 | 1.09 | 0.66 | 1.63 |
| Glycerin (5% Water) | 5.43 | 9.66 | 9.74 | 10.03 | 9.09 |
| Flavor | 0.14 | 0.14 | 0.14 | 0.14 | 0.14 |
| Sodium Saccharin | 0.01 | 0.01 | 0.01 | 0.01 | 0.01 |
| Water Content | 17.28% | 7.45% | 7.49% | 6.45% | 8.69% |
| Viscosity in cps at 25° C. | 28,000 | 77,000 | 20,750 | 65,000 | 92,250 |

Sugarless chewing gum F, containing 3% water, was prepared using the chewing gum formulation and procedure described in U.S. Pat. No. 4,156,740.

Sugarless chewing gum G, containing 1% water, was prepared using the chewing gum formulation and procedure described in U.S. Pat. No. 4,514,422.

Prior art center-fill A of Table I and chewing gum formulation F are used to prepare center-filled chewing gum pieces containing 11% center-fill, based on the total weight of the chewing gum piece, following the procedure described in U.S. Pat. No. 4,156,740.

Inventive Center-Fills B, C and D and comparative Center-Fill E of Table I were prepared as described in Example 1, part A using, in Step 1, a weight ratio of sodium carboxymethylcellulose gum to glycerin of 1:6 for Center-Fill B; 1:24 for Center-Fill C; 1:3 for Center-Fill D; and 1:6 for Center-Fill E.

Substantially anhydrous chewing gum G is used with Center-Fills A-E to prepare center-filled chewing gum pieces containing 11% center-fill, based on the total weight of the chewing gum piece, following the procedure described in Example I, part C.

ACCELERATED AGING TESTS

Wrapped chewing gum pieces containing 11% by weight center-fill, prepared as described above, were storeed for 18 weeks at 37° C., after which the percentage of center-fill remaining in each gum piece was determined. Results are indicated in Table II, with the letters designating the center-fill/chewing gum combination tested.

TABLE II

| Prior Art | | Inventive | | | Comparative |
|---|---|---|---|---|---|
| Ex. 4 | Ex. 5 | Ex. 6 | Ex. 7 | Ex. 8 | Ex. 9 |
| A/F | A/G | B/G | C/G | D/G | E/G |
| 0% | 3.41% | 8.70% | 7.19% | 7.84% | 5.21% |

In the above accelerated aging tests, storage for 18 weeks at 37° C. is equivalent to storage for 18 months at 25° C. For purposes of this test, all sugarless center-filled chewing gum pieces initially contained 11% center-fill, based on the totral weight of the chewing gum piece. Thus center-filled chewing gum pieces which contain 7% of center-fill, based on the total weight of the chewing gum piece, at the end of the accelerated aging test period would be considered acceptable to consumers and would have a shelf-life of 18 months.

The normal shelf-life of conventional sugarless center-filled chewing gum piece A/F represented by Example 4, covering center-fill A with an outer shell F, is 9 months. As shown in Table II, conventional formulation A/F contains no center-fill at all at the end of the accelerated aging period. In Example 5, covering prior art Center-Fill A within a substantially anhydrous chewing gum shell G, center-filled chewing gum piece A/G had very little center-fill remaining after the accelerated aging test period.

Inventive formulations B/G, C/G, and D/G of Examples 6, 7, and 8, respectively, have an exceptional amount of center-fill remaining after 18 weeks at 37° C. and would, therefore, have a shelf-life of 18 months or double the shelf-life of the prior art sugarless center-filled chewing gum.

In Example 9, comparative center-fill E does not contain the critical amounts of ingredients specified for the inventive chewing gum pieces of this invention, i.e., E contains too much sorbitol solution, insufficient glycerin, and too much water. At the end of the accelerated aging period, formulation E/G contained only 5.21% of center-fill (original amount was 11%) which would not be acceptable to consumers.

At the end of the above described 18 week, 37° C. accelerated aging test, the chewing gum pieces of Table II were evaluated for organoleptic qualities.

Prior art gum pieces A/F and A/G of Table II had absolutely no squirt and had holes in the corner of the gum shell due to migration of the center-fill into the gum shell.

Inventive gum pieces B/G, C/G, and D/G of Table II exhibited excellent squirt perception and had no deterioration of the gum shells.

Comparative gum piece E/G of Table II had a very low perception of squirt which was judged unacceptable. In addition, E/G had holes in the corner of the gum piece, indicating that the center-fill had migrated into the gum shell.

Thus, the above comparative examples demonstrate the unpredictability and criticality of the ingredients and the amounts thereof required in the center-filled chewing gum pieces of this invention in order to obtain extended shelf-life and good squirt of flavor characteristics.

The invention being thus described, it will be obvious that the same may be varied in many ways. Such variations are not to be regarded as a departure from the scope and spirit of the invention and all such modifications are intended to be included within the scope of the following claims.

What is claimed is:

1. A sugarless center-filled chewing gum piece having an outer sugarless chewing gum shell enclosing a cavity and a sugarless liquid center-fill within said cavity, said chewing gum piece comprising:
   A. a chewing gum shell containing not more than about 2% by weight thereof water; and
   B. a sugarless liquid center-fill comprising:
      1. about 0.2% to about 1.5% by weight of a natural or synthetic gum selected from the group consisting of carboxymethylcellulose, pectin, propylene glycol alginates, agar and gum tragacanth;
      2. about 85% to about 93% by weight of a glycerin humectant; and
      3. about 6% to about 12% by weight of an additional water-miscible humectant ingredient selected from the group consisting of (a) sorbitol solution or (b) sorbitol solution and propylene glycol; wherein said liquid center-fill has a water content of about 6% to about 8%, based on the total weight of the liquid center-fill, and a viscosity of about 20,000 to about 85,000 centipoises at 25° C.

2. The sugarless center-filled chewing gum piece according to claim 1 wherein said liquid center-fill comprises about 0.2% to about 0.5% by weight of sodium carboxymethylcellulose, about 89% to about 93% by weight of glycerin, and about 6% to about 10% by weight of sorbitol solution, said liquid center-fill having a watr-content of about 6% to about 7.5%, based on the total weight of the liquid center-fill, and a viscosity of about 20,000 to about 80,000 centipoises at 25° C.

3. The sugarless center-filled chewing gum piece according to Claim 1 wherein said liquid center-fill comprises about 1% to about 1.5% by weight of sodium carboxymethylcellulose, about 89% to about 93% by weight of glycerin, and about 6% to about 10% by weight of sorbitol solution, said liquid center-fill having a water content of about 6% to about 7.5%, based on the total weight of the liquid center-fill, and a viscosity of about 20,000 to about 80,000 centipoises at 25° C.

4. The sugarless center-filled chewing gum piece acording to claim 1 wherein, additionally, the center-fill contains a material selected from the group consisting of a flavoring agent, a sweetening agent and mixtures thereof.

5. The sugarless center-filled chewing gum piece according to claim 4 wherein the flavoring agent is selected from the group consisting of peppermint oil, spearmint oil, cinnamon oil, oil of wintergreen (methylsalicylate), lemon oil, orange oil, grape oil, lime oil, grapefruit oil, apple essence, strawberry essence, cherry essence, pineapple essence and mixtures thereof.

6. The sugarless center-filled chewing gum piece according to claim 4 wherein the sweetening agent is selected from the group consisting of saccharin salts, cyclamate salts, Acesulfame-K salts, dipeptide based sweeteners, dihydrochalcone sweeteners, and mixtures thereof.

7. A sugarless center-filled chewing gum piece according to claim 1 wherein the liquid center-fill is incorporated into the chewing gum shell in an amount of about 11% to about 15% by weight of the chewing gum composition.

8. A sugarless liquid center-fill for incorporation into a cavity within a sugarless center-filled chewing gum piece, the shell of said chewing gum piece containing not more than about 2% by weight water, said center-fill comprising:
   A. about 0.2% to about 1.5% by weight of a natural or synthetic gum selected from the group consisting of carboxymethylcellulose, pectin, propylene glycol alginates, agar and gum tragacanth;
   B. about 85% to about 93% by weight of glycerin humectant; and
   C. about 6% to about 12% by weight of an additional water-miscible humectant ingredient selected from the group consisting of (a) sorbitol solution or (b) sorbitol solution and propylene glycol; wherein said sugarless center-fill has a water content of about 6% to about 8%, based on the total weight of the liquid center-fill, and a viscosity of about 20,000 to about 85,000 centipoises at 25° C.

9. The sugarless, liquid center-fill according to claim 8 comprising about 0.2% to about 0.5% by weight of sodium carboxymethylcellulose, about 89% to about 93% by weight of glycerin, and about 6% to about 10% of weight of sorbitol solution, said liquid center-fill having a water-content of about 6% to about 7.5%, based on the total weight of the liquid center-fill, and a viscosity of about 20,000 to about 80,000 centipoises at 25° C.

10. The sugarless liquid center-fill according to claim 8 comprising about 1% to about 1.5% by weight of sodium carboxymethylcellulose, about 89% to about 93% by weight of glycerin, and about 6% to about 10% by weight of sorbitol solution, said liquid center-fill having a water-content of about 6% to about 7.5%, based on the total weight of the liquid center-fill, and a viscosity of about 20,000 to about 80,000 centipoises at 25° C.

11. The sugarless, liquid center-fill according to claim 8 wherein, additionally, the center-fill contains a material selected from the group consisting of a flavoring agent, a sweetening agent, and mixtures thereof.

12. The sugarless liquid center-fill according to claim 11 wherein the flavor is selected from the group consisting of peppermint oil, spearmint oil, cinnamon oil, oil of wintergreen (methylsalicylate), lemon oil, orange oil, grape oil, lime oil, grapefruit oil, apple essence, strawberry essence, cherry essence, pineapple essence and mixtures thereof.

13. The sugarless, liquid center-fill according to claim 11 wherein the sweetening agent is selected from the group consisting of saccharin salts, cyclamate salts, acesulfame K salts, dipeptide based sweeteners, dihydrochalcone sweeteners, and mixtures thereof.

14. A process for preparing the sugarless liquid center-fill of claim 8 which comprises:
   A. mixing the natural or synthetic gum with the glycerin humectant in a weight ratio of from about 1:3 to about 1:24, based on the weight of gum to the weight of glycerin, for a time sufficient to disperse said gum in said glycerin;

B. blending the additional water-miscible humectant with an equal weight of glycerin and heating the blend to a temperature of about 60° C. to about 80° C.;

C. mixing the dispersion of (A) with the heated blend of (B) until a homogenous mixture is formed; and D. adding the remaining glycerin to (C) and mixing for a time sufficient to fully hydrate the natural or synthetic gum with the water present in the reaction mixture and obtain a center-fill having a viscosity of about 20,000 to about 85,000 centipoises at 25° C.

15. The process according to claim 14 wherein, in step (A) the natural or synthetic gum is a low viscosity carboxymethylcellulose gum and wherein the ratio of said gum to said glycerin is from about 1:3 to about 1:6.

16. The process according to claim 14 wherein, in step (A), the natural or synthetic gum is a high viscosity carboxymethylcellulose gum and wherein the ratio of said gum to said glycerin is from about 1:12 to about 1:24.

17. The process according to claim 14 wherein, in step (B) the additional water-miscible humectant is sorbitol solution.

18. The process according to claim 14 wherein the viscosity of the liquid center-fill is about 20,000 to about 80,000 centipoises at 25° C.

19. The process according to claim 14 wherein, additionally, a material selected from the group consisting of a flavoring agent, a sweetening agent, and mixtures thereof, is added to the mixture of step (D) in an amount sufficient to impart taste thereto.

20. A process for preparing a sugarless center-filled chewing gum piece having a substantially anhydrous, sugarless outer chewing gum shell enclosing a cavity, which comprises incorporating within said cavity a sugarless liquid center-fill comprising:

(A) about 0.2% to about 1.5% by weight of a natural or synthetic gum selected from the group consisting of carboxymethylcellulose, pectin, propylene glycol alginates, agar and gum tragacanth;

(B) about 85% to about 93% by weight of a glycerin humectant; and (C) about 6% to about 12% by weight of an additional water-miscible humectant ingredient selected from the group consisting of (a) sorbitol solution or (b) sorbitol solution and propylene glycol;

wherein said liquid center-fill has a water content of about 6% to about 8%, based on the total weight of the liquid center-fill, and a viscosity of about 20,000 to about 85,000 centipoises at 25° C.

21. The process according to claim 20 wherein the liquid center-fill comprises about 0.2% to about 0.5% by weight of sodium carboxymethylcellulose, about 89% to about 93% by weight of glycerin, and about 6% to about 10% by weight of sorbitol solution, said liquid center-fill having a water-content of about 6% to about 7.5%, based on the total weight of the liquid center-fill and a viscosity of about 20,000 to about 80,000 centipoises at 25° C.

22. The process according to claim 20 wherein the liquid center-fill comprises about 1% to about 1.5% by weight of sodium carboxymethylcellulose, about 89% to about 93% by weight of glycerin, and about 6% to about 10% by weight of sorbitol solution, said liquid center-fill having a water-content of about 6% to about 7.5%, based on the total weight of the liquid center-fill, and a viscosity of about 20,000 to about 80,000 centipoises at 25° C.

23. The process according to claim 20 wherein the liquid center-fill is incorporated into the chewing gum shell in an amount of about 11% to about 15% by weight of the chewing gum piece.

* * * * *